United States Patent
Willmann et al.

(10) Patent No.: US 6,446,435 B1
(45) Date of Patent: Sep. 10, 2002

(54) HYDRAULIC BRAKING SYSTEM FOR AUTOMOBILES

(75) Inventors: Karl-Heinz Willmann, Freiberg; Dietmar Baumann, Moglingen; Hardy Haas, Markgroningen, all of (DE); Stephane Schmit, Briey (FR); Herbert Vollert, Lauffen/Neckar; Andreas Reppich, Leonberg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,236
(22) PCT Filed: Mar. 27, 1999
(86) PCT No.: PCT/DE99/00939
§ 371 (c)(1), (2), (4) Date: Apr. 10, 2000
(87) PCT Pub. No.: WO99/64283
PCT Pub. Date: Dec. 16, 1999

(30) Foreign Application Priority Data

Jun. 5, 1998 (DE) .......................................... 198 25 114

(51) Int. Cl.[7] .............................. F15B 7/00; F04B 1/04; B60T 8/40
(52) U.S. Cl. ........................ 60/533; 417/273; 303/116.4
(58) Field of Search ................................ 60/533; 92/68, 92/72; 303/116.4; 417/273, 415; 91/422

(56) References Cited

U.S. PATENT DOCUMENTS 5,529,466 A * 6/1996 Tackett ................ 303/116.4 X
5,895,207 A * 4/1999 Burgdorf et al. ........ 417/415 X

* cited by examiner

Primary Examiner—John E. Ryznic
(74) Attorney, Agent, or Firm—Ronald E. Greigg

(57) ABSTRACT

The invention relates to a vehicle hydraulic brake system with electrohydraulic brake boosting by a piston pump. In order to reduce pressure pulsations on an intake side of the multi-piston pump, the brake system embodies a multi-piston pump, for example, as a six-piston pump with stepped pistons that are driven with an alternating phase shift of 30° and 90° in relation to one another. The phase shift of the drive of the stepped pistons is selected so that the intake volume flows have a uniform phase shift, by which the total intake volume flow of the multi-piston pump has a reduced amplitude of the pressure pulsation, which reduces the repercussions on a master cylinder.

20 Claims, 3 Drawing Sheets

HYDRAULIC BRAKING SYSTEM FOR AUTOMOBILES

PRIOR ART

The invention relates to a vehicle hydraulic brake system

A vehicle hydraulic brake system of this kind has been disclosed by DE 195 01 760 A1. The known vehicle brake system has a master cylinder, a number of wheel brake cylinders, and a hydraulic pump with which brake fluid can be delivered from the master cylinder to the wheel brake cylinders. The hydraulic pump is used for hydraulic brake boosting. It can likewise be used for antilock braking, traction control, and electronic stability programming, wherein in order to reduce pressure in the wheel brake cylinders by way of valves, the intake side of the hydraulic pump can be connected to the wheel brake cylinders and the pressure side of the hydraulic pump can be connected to the master cylinder. It is conventional per se to embody the hydraulic pumps in vehicle brake systems of this kind as dual piston pumps with pistons disposed opposite each other in a boxer arrangement, which are driven by a common cam disposed between the two pistons. The two pistons operate in anti-phase, i.e. while one of the two pistons is executing a delivery stroke, the other piston is executing a return stroke. The delivery stroke is the stroke in which the piston decreases the volume of a displacement chamber in a cylinder of the piston pump and thus displaces fluid from the piston pump. In the return stroke, the volume of the displacement chamber is increased again; this stroke is also often called the intake stroke. Due to their oscillating operation, piston pumps have an oscillating intake volume flow and cause pressure pulsations on the intake side, which have repercussions on the master cylinder and produce an unpleasant sensation in a foot brake pedal and generate clearly audible noise. Both of these are undesirable, particularly if the hydraulic pump is used for hydraulic brake boosting, i.e. is operated with each braking maneuver. However, in antilock braking, traction control, and electronic stability programming as well, which are only active in unusual driving situations, it is at least desirable to reduce the pressure pulsations. It is also known to embody the pistons of the piston pump as stepped pistons which have the advantage of aspirating brake fluid during both the delivery stroke and the return stroke. A stepped piston has the advantage over a simple piston of a more uniform intake volume flow with a reduced amplitude and a doubled frequency.

ADVANTAGES OF THE INVENTION

The vehicle hydraulic brake system has a multi-piston pump with an even number of stepped pistons. The stepped pistons are driven in a phase-shifted but not anti-phase manner, i.e. are not driven with a phase angle of $\pi$. The stepped pistons of the vehicle brake system according to the invention therefore reach their dead centers one after another. The intake of the stepped pistons from the master cylinder therefore takes place in a time-delayed fashion, wherein the intake volume flows of the different stepped pistons partially overlap. This has the advantage that the entire intake volume flow of the multi-piston pump, i.e. the sum of the intake volume flows of all of the stepped pistons, is more uniform. The individual intake volume flows overlap one another, and the total intake volume flow fluctuates with a reduced amplitude around an average. The magnitude of the pressure pulsations on the intake side of the piston pump, which have repercussions on the master cylinder, are reduced. It is therefore immaterial with regard to the intake side whether successive stepped pistons reach their top dead centers in succession and then reach their bottom dead centers in succession or whether in succeeding stepped pistons, a preceding stepped piston reaches the top dead center and a subsequent stepped piston reaches the bottom dead center and vice versa. In any case this is true if the intake volume flows in the delivery stroke and in the return stroke are approximately the same size. For the pressure side, an evening out of the volume flow occurs when, with a multi-piston pump that has an even number of four or more stepped pistons, the succeeding stepped pistons alternatingly reach the top dead center and the subsequent stepped pistons reach the bottom dead center.

The invention is provided in particular for a vehicle hydraulic brake systems with electrohydraulic brake boosting, i.e. in vehicle brake systems in which a brake pressure built up in the master cylinder is increased through the use of the multi-piston pumps, or for electrohydraulic vehicle brake systems in which the brake pressure is produced with the master cylinder only in the event of a malfunction but during normal operation, is not produced with the master cylinder, but only with the multi-piston pump since with these vehicle brake systems, the multi-piston pump is actuated with each braking operation and its repercussions on the master cylinder can be felt. However, the invention is also advantageous for other vehicle hydraulic brake systems with a hydraulic pump, for example for antilock braking, traction control, and/or electronic stability programming, even when the multi-piston pump in such vehicle brake systems is not operated during normal braking maneuvers without slippage in the vehicle wheels, and the advantages of the invention only become apparent once the antilock braking, traction control, or electronic stability programming is used.

In accordance with the invention, multi-piston pumps are also understood to mean several piston pumps that are independent of one another and are synchronized with each other, for example electronically or mechanically, for example by means of gears. Thus for example, two piston pumps that are synchronized with one another can be used for the two brake circuits of a dual-circuit vehicle brake system. Possible designs include, for example, star-shaped arrangements of the stepped pistons around a common cam, also a number of stars in succession, rows, V-shaped arrangements or boxer arrangements of stepped pistons with an eccentric shaft, camshaft, or crankshaft for driving the stepped pistons in a synchronous, phase-shifted manner.

Advantageous embodiments and improvements of the invention disclosed herein are the subject of the invention.

The stepped pistons of the multi-piston have a phase shift of approximately $\pi$ divided by the number of stepped pistons or a multiple of this value, but do not have a phase shift of $\pi$ because this would be anti-phase. One stepped piston would always be executing the delivery stroke and at the same time, a piston operating in anti-phase to this would be executing the return stroke. The two anti-phase pistons would aspirate simultaneously since they aspirate both during the delivery stroke and the return stroke. This would not lead to a reduction of the pulsation by means of the overlapping of the intake volume flows, but would on the contrary lead to an addition and therefore to an intensification of the pulsation. The phase shift of $\pi$ divided by the number of stepped pistons produces a uniform chronological distribution of the intake volume flows of the stepped pistons. Deviations from this phase shift can be suitable, e.g. for the sake of the space-saving accommodation of the stepped pistons in a pump housing.

The vehicle brake system according to the invention can be embodied as a single-circuit brake system with a multi-piston pump that has at least two stepped pistons which act on a brake circuit.

It is also possible to embody the vehicle brake system according to the invention as a multi-circuit, for example dual-circuit, brake system which has at least one stepped piston for each brake circuit. The pressure pulsations occurring on the intake side of the multi-piston pump in each brake circuit are compensated for in a common master cylinder. Preferably, an at least partial pressure compensation takes place between the brake circuits for example by means of a master cylinder which has a floating piston. claims.

The provision is made that the stepped pistons have an approximately equal intake volume in the delivery stroke and in the return stroke, i.e. on an end that is tapered due to the piston step, the stepped pistons have approximately half the cross-sectional area as on their other end.

BRIEF DESCRIPTION OF THE DRAWINGS

The invention will be explained in detail below in conjunction with two exemplary embodiments shown in the drawings.

DESCRIPTION OF THE EXEMPLARY EMBODIMENTS

Figure 1:
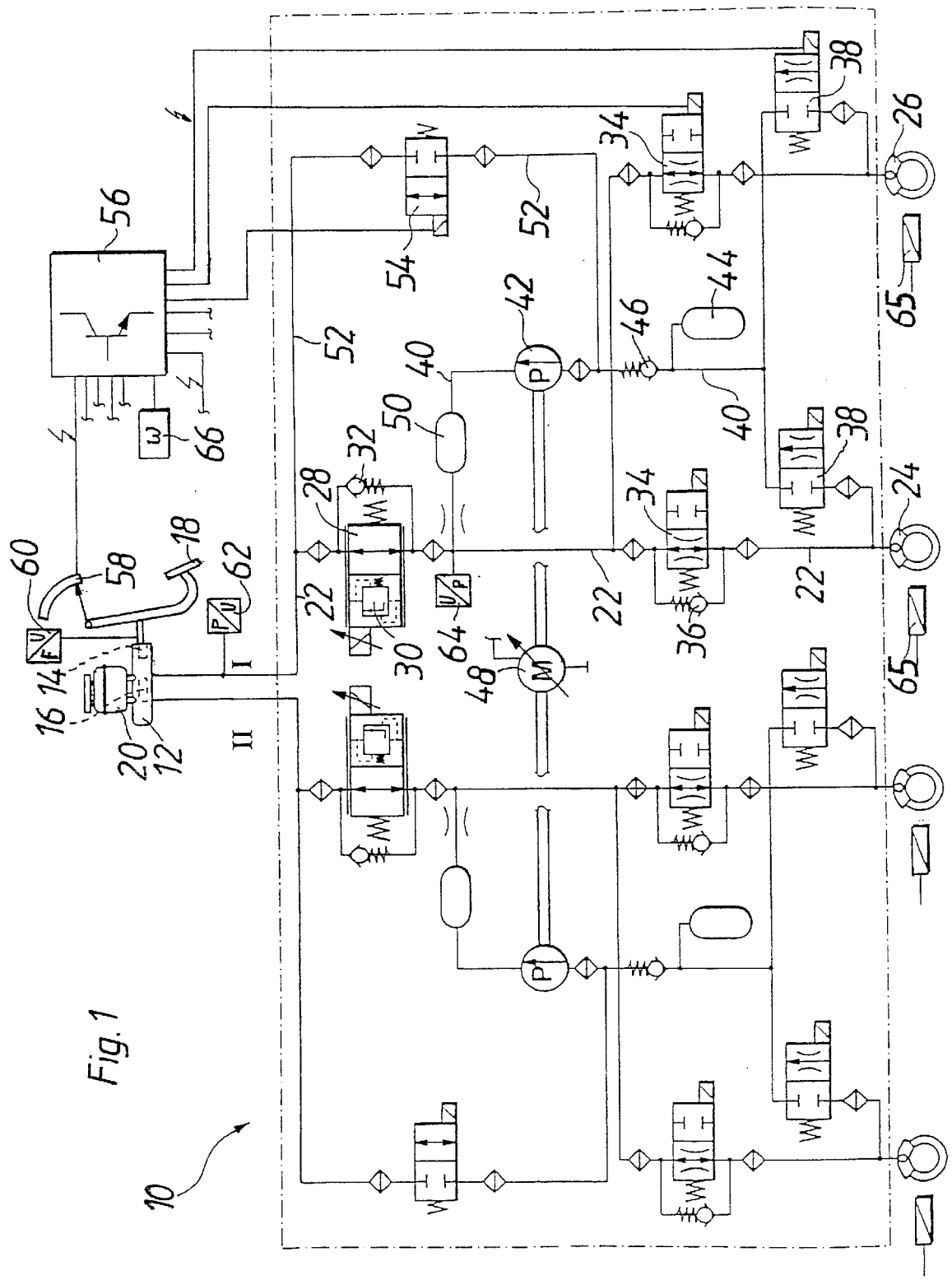
FIG. 1 is a hydraulic connection diagram of a vehicle brake system according to the invention.

The vehicle hydraulic brake system 10 according to the invention shown in FIG. 1 is embodied as a dual-circuit brake system which has two brake circuits I, II that are independent of each other. The brake circuits I, II are connected to a dual-circuit master cylinder 12, which in an intrinsically known manner has a rod piston 14 and a floating piston 16, which are indicated with dashed lines. The rod piston 14 is actuated directly by a foot brake pedal 18, the floating piston 16 is acted on by the pressure produced by the rod piston 14 and as a result, likewise produces a brake pressure in the second brake circuit II. Furthermore, the master cylinder 12 has a brake fluid reservoir 20.

The two brake circuits I, II are correspondingly embodied and function in the same manner. The two brake circuits I, II will be described below in conjunction with the brake circuit I shown on the right in FIG. 1. A main brake line 22 leads from the master cylinder 12 to two wheel brake cylinders 24, 26 connected to the brake circuit I. A reversing valve 28 is disposed in the main brake line 22. The reversing valve 28 is embodied as a 2/2-way proportional solenoid valve that is open in its normal position. A differential pressure valve 30 is integrated into the reversing valve 28 and limits an overpressure in the wheel brake cylinders 24, 26. The reversing valve 28 is connected in parallel with a check valve 32 which can be flowed through in the direction toward the wheel brake cylinders 24, 26.

On a wheel brake cylinder side of the reversing valve 28, the main brake line 22 branches to the two wheel brake cylinders 24, 26. By way of a brake pressure increase valve 34, which is connected in parallel with a check valve 36 that can be flowed through in the direction toward the master cylinder 12, each wheel brake cylinder 24, 26 is connected to the reversing valve 28 and by way of this valve, to the master cylinder 12. Furthermore, each wheel brake cylinder 24, 26 is associated with a brake pressure reduction valve 38 from which a common return line 40 leads to the intake side of a hydraulic pump 42. The brake pressure increase valve 34 and the pressure reduction valve 38 constitute a brake pressure modulation valve apparatus of the associated wheel brake cylinder 24, 26. The brake pressure increase valves 34 and the brake pressure reduction valves 38 are 2/2-way solenoid valves, wherein the brake pressure increase valves 34 are open in their normal position and the brake pressure reduction valves 38 are closed in their normal position.

The return line 40 is connected to a hydraulic accumulator 44 and a check valve 46 that can be flowed through in the direction toward the hydraulic pump 42 is disposed in the return line 40 on the intake side of the hydraulic pump 42. The hydraulic pumps 42 of the two brake circuits I, II are driven by a common, speed-controllable electric pump motor 48.

The return line 40 leads from a pressure side of the hydraulic pump 42 to the main brake line 22, into which it feeds between the reversing valve 28 and the brake pressure increase valves 34. A damper chamber 50 is disposed in the return line 40 on the pressure side of the hydraulic pump 42.

Between the master cylinder 12 and the reversing valve 28, an intake line 52 branches from the main brake line 22 and is connected to the intake side of the return feed pump 42. An intake valve 54, which is embodied as a 2/2-way solenoid valve that is closed in its normal position, is disposed in the intake line 52.

For brake regulation, the vehicle brake system 10 according to the invention has an electronic control unit 56 which controls the pump motor 48 and the solenoid valves 28, 34, 38, 54. The vehicle brake system 10 has an electrohydraulic brake boosting. The foot brake pedal 18 and/or the master cylinder 12 are used as brake pressure set point adjusters for a wheel brake pressure to be produced in the wheel brake cylinders 24, 26. The brake pressure set point is measured by means of a pedal path sensor 58 that measures a path or angle by which the foot brake pedal 18 is depressed, by means of a pedal force sensor 60 that measures a pedal force with which the foot brake pedal 18 is depressed, or by means of a brake pressure sensor 62 that is connected to the master cylinder 12, with which a brake fluid pressure in one of the chambers of the master cylinder 12 is measured. Only one of the sensors 58, 60, 62 is required. A signal of the sensors 58, 60, 62 is conveyed to the electronic control device 56, which upon actuation of the foot brake pedal 18, closes the reversing valve 29, opens the intake valve 54, and initiates operation of the hydraulic pump 42. By way of the open intake valve 54, the hydraulic pump 42 aspirates brake fluid from the master cylinder 12 and delivers it through the open brake pressure increase valves 34 into the wheel brake cylinders 24, 26. The wheel brake pressure is measured with a pressure sensor 64, which is connected to the main brake line 22 between the brake pressure increase valves 34 and the reversing valve 28. The regulation/increase of the wheel brake cylinder pressure to a value dependent on brake pedal actuation takes place on the one hand by way of the speed of the pump motor 48. On the other hand, the wheel brake pressure can also be controlled or regulated by means of the reversing valve 28, the brake pressure increase valves 34, the brake pressure reduction valves 38, and the intake valve 54.

Furthermore, the vehicle brake system 10 according to the invention has an antilock braking apparatus, a traction control apparatus, and an electronic stability programming apparatus. For the antilock braking and the traction control, each vehicle wheel that can be braked is associated with a wheel rotation sensor 65, which sends a signal sequence to the electronic control unit 56. For the electronic stability program, the vehicle brake system 10 has a gyroscope 66, which measures a rotational velocity of the vehicle around its vertical axis and sends a signal to the electronic control unit 56. For the traction control and electronic stability program, the reversing valve 28 is closed, the intake valve 54 is opened, and the operation of the hydraulic pump 42 is initiated. The regulation of the wheel brake pressure takes place individually for each wheel brake cylinder 24, 26 in an intrinsically known manner through brake pressure modulation by means of the brake pressure increase valve 34 and the brake pressure reduction valve 38.

Figure 2:
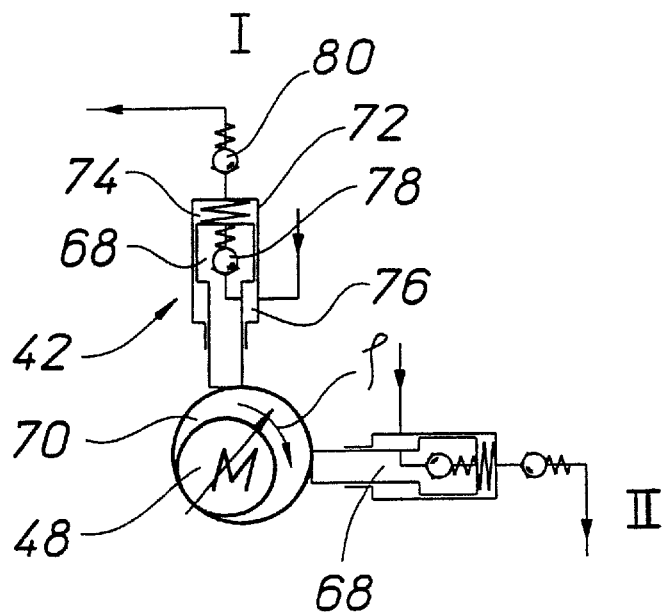
FIG. 2 is a schematic representation of a dual-piston pump of the vehicle brake system shown in FIG. 1.

FIG. 2 shows a schematic, simplified depiction of a pump unit that includes the common pump motor 48 and the two hydraulic pumps 42 of the two brake circuits I, II. It is a dual-piston pump 42 that has two stepped pistons 68, both of whose stepped pistons 68 are driven by a cam element 70 that can be driven by the pump motor 48. Each brake circuit I, II is associated with a stepped piston 68, which along with its cylinder 72, constitutes the hydraulic pump 42 of the respective brake circuit I, II.

A hydraulic pump 42 that has stepped pistons 68 has been disclosed, for example, by DE 44 07 978 A1, to which reference is made with regard to the possible design and function of stepped piston pumps. On an end oriented toward a displacement chamber 74 of the hydraulic pump 42, the stepped piston 68 is guided in the cylinder 72 on a larger diameter than on the end oriented toward the cam element 70. The stepped piston 68 forms an annular chamber 76 in the cylinder 72, by means of which the hydraulic pump 42 aspirates. An inlet valve 78 is integrated into the piston 68 and an outlet valve 80 is connected to the displacement chamber 74. The inlet 78 and the outlet valve 80 are embodied as check valves.

Figure 3A:
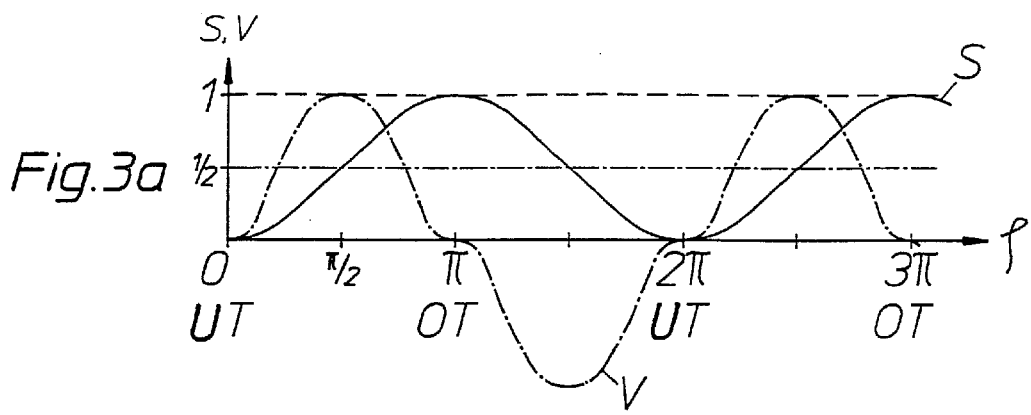
FIGS. 3a to 3d are path, velocity, and volume flow graphs for the dual-piston pump from FIG. 2.

The piston path (piston stroke) s and the piston velocity v are plotted over the rotation angle $\phi$ of the cam element 70 in FIG. 3a, wherein when $\phi = 0$ and $\phi = 2\pi$, the stepped piston 68 is disposed at the bottom dead center (UT), i.e. is disposed in the position in which it is slid the furthest out from the cylinder 72, and at an angle of $\phi = \pi$, the stepped piston 68 is at the top dead center (OT), i.e. is disposed in the position in which it is slid the furthest into the cylinder 72.

Figure 3B:
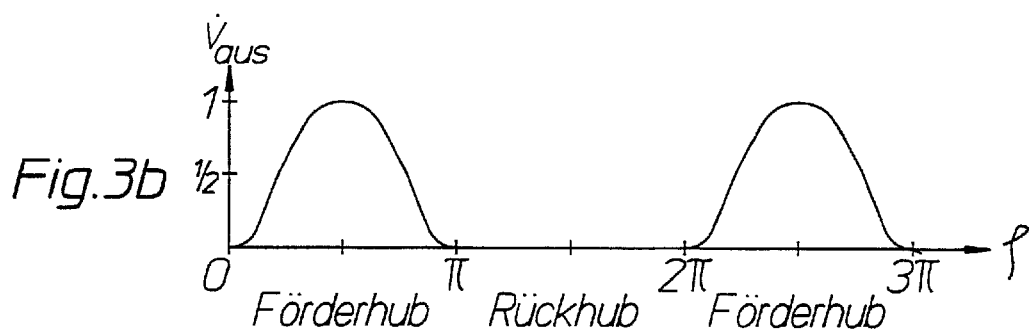

The reciprocating stroke motion of the stepped piston 68 produces a pulsating brake fluid volume flow $V_{out}$ (FIG. 3b) on the pressure side of the hydraulic pump 42, which varies sinusoidally from the bottom dead center ($\phi = 0$) to the top dead center ($\phi = \pi$) during a delivery stroke of the stepped piston 68, as does the piston velocity v. During a return stroke from the top dead center ($\phi = \pi$) to the bottom dead center ($\phi = 2\pi$), the volume flow is zero on the pressure side of the hydraulic pump 42.

Figure 3C:
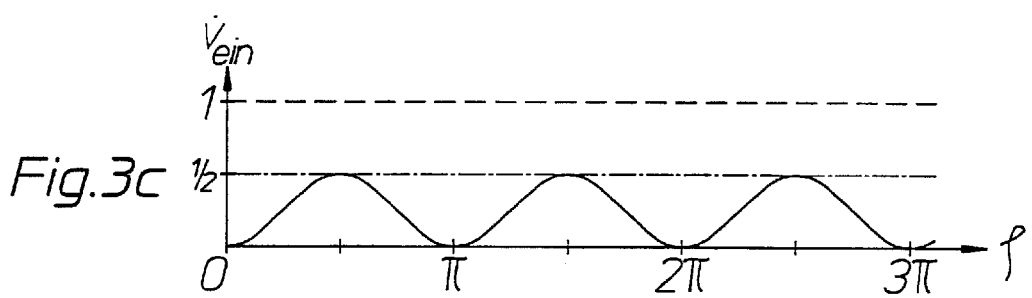
Figure 3D:
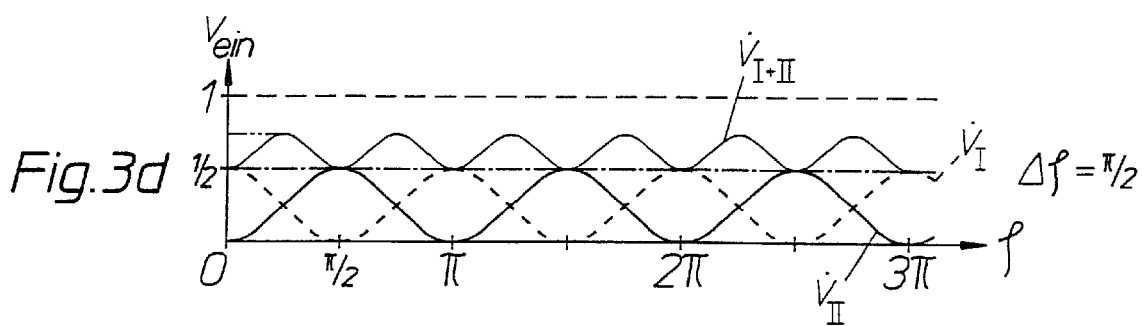

On the intake side, a different progression of the brake fluid volume flow $V_{in}$ takes place, as shown in FIG. 3c. During the delivery stroke from the bottom dead center to the top dead center, the inlet valve 78 integrated into the stepped piston 68 is closed and the annular chamber 76 on the intake side of the hydraulic pump 42 is shut off from the displacement chamber 74. Because the stepped piston 68 is slid into the cylinder 72, the annular chamber 76 is enlarged and the hydraulic pump 42 aspirates brake fluid. During the return stroke from top dead center to the bottom dead center, the volume of the annular chamber 76 is in fact reduced in size and the volume of the displacement chamber 74 is simultaneously enlarged. Since a cross sectional area of the displacement chamber 74 is greater than that of the annular chamber 76, on the whole a volume increase is also produced during the return stroke of the stepped piston 68 so that during the return stroke as well, the hydraulic pump 42 aspirates brake fluid into the displacement chamber 74 through the now-open inlet valve 78. On the whole, the sinusoidal progression of the intake volume flow shown in FIG. 3c is produced during both the delivery stroke and the return stroke. The intake volume flow is zero only at the dead centers of the stepped piston 68 and brake fluid is always aspirated during the piston movement between the dead centers. The amplitude of the intake volume flow during the delivery stroke in relation to the return stroke depends on the cross sectional areas of the stepped piston 68 on its larger diameter end and on its smaller diameter end. Preferably, the cross sectional area of the stepped piston 68 on its smaller diameter end is half that of its larger diameter end so that the cross sectional area of the annular chamber 76 is half that of the displacement chamber 74, which produces uniform intake volume flows during both the delivery stroke and the return stroke. The total intake volume during a complete rotation of the cam element 70 is the same size as the total outflow volume. The graphs in FIGS. 3a to 3d are respectively normed to the value 1, are understood to be schematic, and do not absolutely indicate the actual progression of the value of the variables indicated. They are merely intended to aid in comprehension of the invention.

The two stepped pistons 68 of the dual-piston pump shown in FIG. 2 are driven with a phase shift of $\Delta\phi = \pi/2$. For this phase shift, the stepped pistons 68 do not have to be accommodated in a 90° V-disposition as shown in FIG. 2; the stepped pistons 68 can, for example, also be provided in a series disposition and can be driven by cam elements that are offset by 90° from one another (not shown). The intake volume flows $V_I$, $V_{II}$, of the two stepped pistons 68 are shifted by $\pi/2$; this produces the progression shown in FIG. 3d. The addition of the two intake volume flows $V_{I+II}$ produces a pressure pulsation around an increased average, with a considerably reduced amplitude. Since the floating piston 16 of the master cylinder 12 produces a pressure compensation between the brake circuits I, II, the repercussions on the foot brake pedal 18 are significantly reduced by the phase shifting of the drive of the stepped pistons 68 by $\pi/2$.

Figure 4:
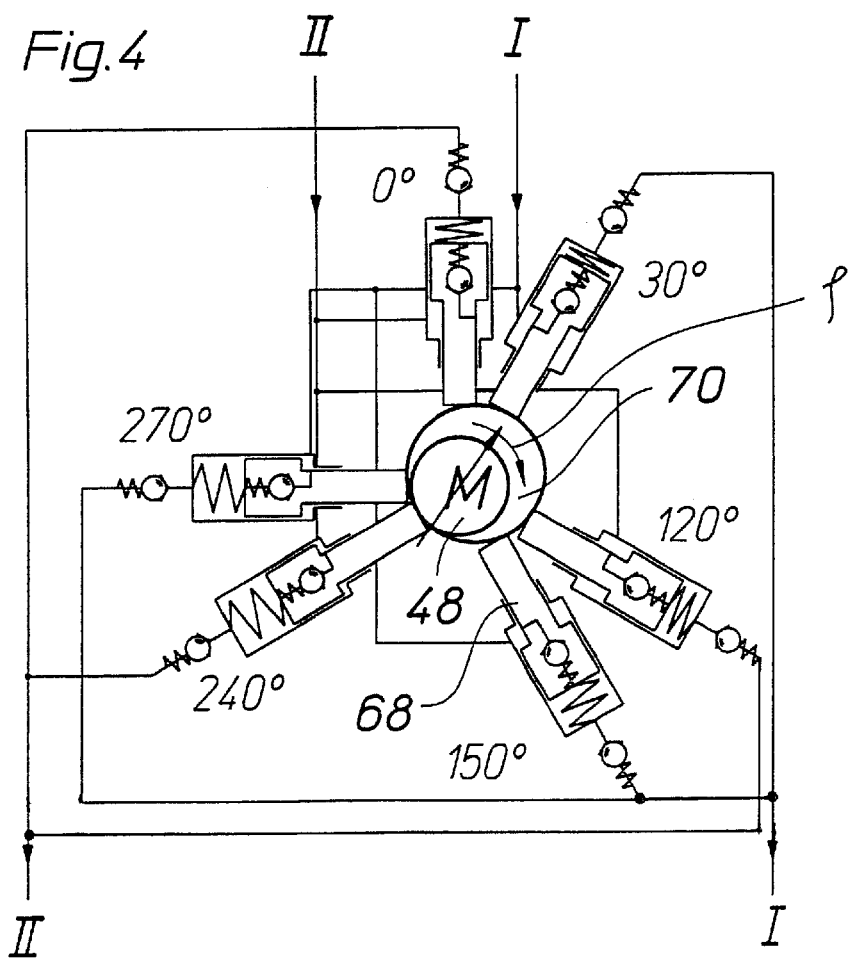
FIG. 4 is a schematic representation of a six-piston pump of the vehicle brake system shown in FIG. 1.

FIG. 4 shows a six-piston pump with stepped pistons 68 disposed in a star shape, which is provided in a modified embodiment of the vehicle brake system 10 according to the invention, instead of the dual-piston pump shown in FIG. 2. In principle, the six-piston pump from FIG. 4 is embodied the same as the dual-piston pump shown in FIG. 2; to this extent, reference is made to the explanations of FIG. 2; components that are the same have been given the same reference numerals. The six stepped pistons 68 are disposed in a star shape around the cam element 70 that can be driven to rotate by the pump motor 48, wherein the stepped pistons 68 are disposed at an angle of 0°, 30°, 120°, 150°, 240°, and 270°. The stepped pistons 68 therefore alternatingly have a phase shift of 30° and 90°. A set of three stepped pistons 68 offset from one another by 120° are hydraulically connected to one another in parallel and are associated with one brake circuit I; they constitute the hydraulic pump 42 of this brake circuit. The other three stepped pistons 68, which are likewise offset from one another by 120° and are offset from the first three stepped pistons by 30°, are likewise hydraulically connected to one another in parallel, and constitute the hydraulic pump 42 of the other brake circuit II. The six-piston pump of FIG. 4 consequently has two hydraulic pumps 42, wherein the three stepped pistons 68 of one hydraulic pump are offset from one another by 120° and are also offset from the stepped pistons 68 of the other hydraulic pump by 30°.

In principle, the phase shifting of the six stepped pistons 68 by 30° and 90° produces the same compensation effect of the pressure pulsations on the intake sides of the stepped pistons 68 as in the dual-piston shown in FIG. 2; the total intake volume flow, i.e. the sum of all six intake volume flows, has a significantly reduced fluctuation amplitude in comparison to a six-piston pump with stepped pistons that are each uniformly offset from on another by 60°. The progression of the six intake volume flows is not shown since a depiction of six volume flows would be more confusing than clarifying. The use of stepped pistons 68 and their alternating disposition offset from one another by 30° and 90° results in a uniform phase shifting of the intake volume flows by 30° in relation to one another. With a uniformly distributed disposition of the stepped pistons 68 respectively offset by 60°, the intake volume flows of opposing stepped pistons 68 would travel in anti-phase with each other without a phase shift; in sum, this would result in three intake volume flows with a phase shift of 120° and twice the amplitude of the six intake volume flows of the six-piston pump shown in FIG. 4.

The foregoing relates to a preferred exemplary embodiment of the invention, it being understood that other variants and embodiments thereof are possible within the spirit and scope of the invention, the latter being defined by the appended claims.

What is claimed is:

1. A vehicle hydraulic brake system with a master cylinder, a wheel brake cylinder, and a multi-piston pump that has an even number of stepped pistons, an inlet check valve (78) disposed in each of the stepped pistons, an intake side of each inlet check valve is connected to the master cylinder through an annular chamber (76) and each of the stepped pistons include a displacement chamber (74) with an outlet check valve (80) connected on a pressure side of each of the outlet check valves which are connected to the wheel brake cylinder, an end of each of the stepped pistons oriented towards the displacement chamber (74) having a larger diameter than an end oriented towards the annular chamber (76) and a drive of the stepped pistons (68) of the multi-purpose pump (42) takes place in a phase-shifted manner.

2. The vehicle hydraulic brake system according to claim 1, in which the vehicle brake system is a single-circuit brake system with a multi-piston pump (42) that has at least two stepped pistons (68).

3. The vehicle hydraulic brake system according to claim 1, in which the vehicle brake system (10) is a multi-circuit brake system with a multi-piston pump (42) that has at least one stepped piston (68) for each brake circuit (I, II).

4. The vehicle hydraulic brake system according to claim 3, in which successive stepped pistons (68) of the multi-piston pump (42) are connected to different brake circuits (I, II).

5. The vehicle hydraulic brake system according to claim 3, in which the brake circuits (I, II) have a pressure compensation device (16).

6. The vehicle hydraulic brake system according to claim 5, in which the brake circuits (I, II) are connected to a multi-circuit master cylinder (12) which has at least one floating piston (16).

7. The vehicle hydraulic brake system according to claim 1, in which the stepped pistons (68) have approximately the same intake volume in a delivery stroke as in a return stroke.

8. The vehicle hydraulic brake system according to claim 1, in which the vehicle brake system (10) has a reversing valve (28) by means of which the pressure side of the multi-piston pump (42) is connected to the master cylinder (12).

9. The vehicle hydraulic brake system according to claim 1, in which the vehicle brake system (10) has an intake valve (54) which is interposed between the intake side of the multi-piston pump (42) and the master cylinder (12).

10. The vehicle hydraulic brake system according to claim 1, in which the vehicle brake system (10) has a brake pressure modulation valve apparatus (34, 38).

11. A vehicle hydraulic brake system with a master cylinder, a wheel brake cylinder, and a multi-piston pump that has an even number of stepped pistons, an inlet check valve (78) disposed in each of the stepped pistons, an intake side of each inlet check valve is connected to the master cylinder and each of the stepped pistons include a displacement chamber (74) with an outlet check valve (80) connected on a pressure side of each of the outlet check valves which are connected to the wheel brake cylinder, and a drive of the stepped pistons (68) of the multi-purpose pump (42) takes place in a phase-shifted manner, in which the drive of the stepped pistons (68) is carried out with a phase shift of approximately $\pi$ divided by the number of stepped pistons (68) or a multiple of this value, but not with a phase shift of II.

12. The vehicle hydraulic brake system according to claim 11, in which the vehicle brake system is a single-circuit brake system with a multi-piston pump (42) that has at least two stepped pistons (68).

13. The vehicle hydraulic brake system according to claim 11, in which the vehicle brake system (10) is a multi-circuit brake system with a multi-piston pump (42) that has at least one stepped piston (68) for each brake circuit (I, II).

14. The vehicle hydraulic brake system according to claim 13, in which successive stepped pistons (68) of the multi-piston pump (42) are connected to different brake circuits (I, II).

15. The vehicle hydraulic brake system according to claim 13, in which the brake circuits (I, II) have a pressure compensation device (16).

16. The vehicle hydraulic brake system according to claim 15, in which the brake circuits (I, II) are connected to a multi-circuit master cylinder (12) which has at least one floating piston (16).

17. The vehicle hydraulic brake system according to claim 11, in which the stepped pistons (68) have approximately the same intake volume in a delivery stroke as in a return stroke.

18. The vehicle hydraulic brake system according to claim 11, in which the vehicle brake system (10) has a reversing valve (28) by means of which the pressure side of the multi-piston pump (42) is connected to the master cylinder (12).

19. The vehicle hydraulic brake system according to claim 11, in which the vehicle brake system (10) has an intake valve (54) which is interposed between the intake side of the multi-piston pump (42) and the master cylinder (12).

20. The vehicle hydraulic brake system according to claim 11, in which the vehicle brake system (10) has a brake pressure modulation valve apparatus (34, 38).

* * * * *